United States Patent [19]

Coppa

[11] Patent Number: 4,580,922

[45] Date of Patent: Apr. 8, 1986

[54] VERTEX FITTINGS DERIVED FROM A MASTER FITTING

[75] Inventor: Anthony P. Coppa, Merion, Pa.

[73] Assignee: General Electric Co., Philadelphia, Pa.

[21] Appl. No.: 682,173

[22] Filed: Dec. 17, 1984

[51] Int. Cl.[4] .............. F16B 1/00; E04H 12/10
[52] U.S. Cl. .................... 403/403; 403/205; 403/170; 403/172; 403/176; 52/645; 52/648; 52/693
[58] Field of Search .............. 403/187, 205, 231, 403, 403/170–172, 176; 52/645, 646, 648, 108, 693

[56] References Cited

U.S. PATENT DOCUMENTS

| | | | |
|---|---|---|---|
| 3,368,319 | 2/1968 | Werner et al. | 52/648 X |
| 3,461,635 | 8/1969 | Hughes | 52/648 X |
| 3,914,063 | 10/1975 | Papayoti | 403/176 X |
| 4,332,501 | 6/1982 | Slysh | 52/108 X |
| 4,381,636 | 5/1983 | Sapp | 403/171 X |
| 4,473,986 | 10/1984 | Zeigler | 52/645 |
| 4,483,118 | 11/1984 | Betschart | 403/171 X |

Primary Examiner—Cornelius J. Husar
Assistant Examiner—Todd G. Williams
Attorney, Agent, or Firm—Allen E. Amgott

[57] ABSTRACT

A master fitting is disclosed adapted to be subdivided into a set of vertex fittings for use in a truss structure which comprises a plurality of frame elements. Interchangeable vertex fittings with accurately aligned surfaces, slots and holes are provided at a low cost. The vertex fittings are adapted to form the frame elements with mating struts, or to form hinge joints for interconnecting groups of frame elements. The invention permits ease of assembly and quick and easy removal and replacement of a strut in the truss structure.

10 Claims, 7 Drawing Figures

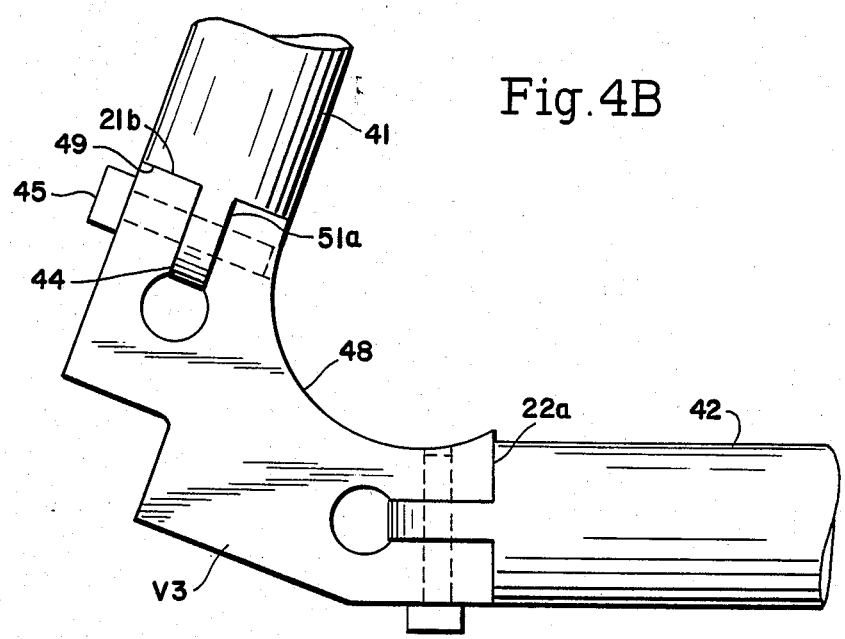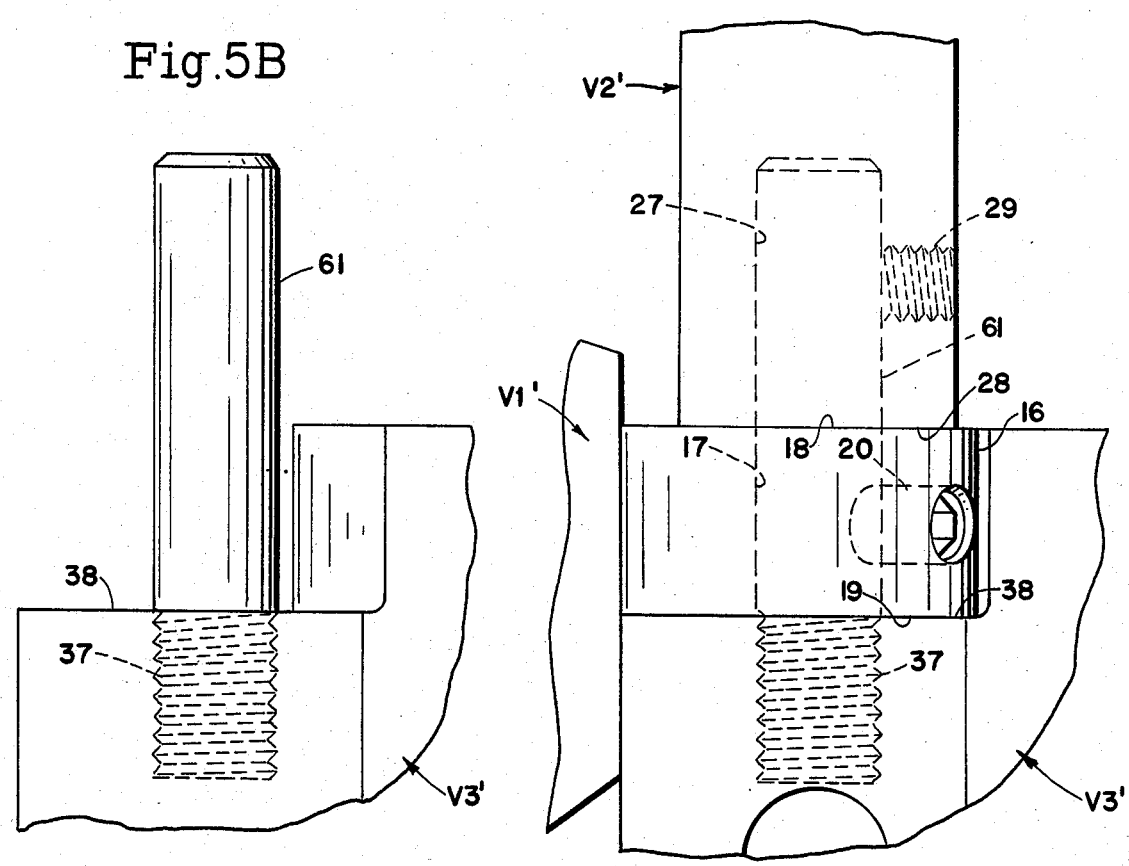

VERTEX FITTINGS DERIVED FROM A MASTER FITTING

The present invention relates in general to vertex fittings for the frame elements of truss structures and to a master fitting which may be subdivided into a set of vertex fittings having accurately aligned surfaces, slots and holes for the construction of the truss structure.

The invention herein may be used in the construction of a truss structure described and claimed in a copending patent application, Ser. No. 06/605372 filed Apr. 27, 1984, which is assigned to the assignee of the present application.

BACKGROUND OF THE INVENTION

It is known to join a number of triangular frame elements at their vertices to construct a truss structure having the shape of an oblique trianglar prism. The integrity of the completed truss structure depends in part on the dimensions of the individual frame elements and their alignment. The latter factors are in turn governed by the precision and alignment of the vertex fittings. Thus, accurate alignment of surfaces, slots and holes in the three types of vertex fittings used to construct a frame element is required. The critical centering and mating of holes, slots and surfaces of the individual vertex fittings with the struts used in the truss structure is difficult and expensive to achieve when each fitting is machined separately. Unless achieved, it may lead to misalignment in the construction of the individual frame elements or of the truss structure, to increased costs and time of construction, and to waste of materials and parts.

OBJECTS OF THE INVENTION

It is a principal object of the present invention to provide new and improved vertex fittings which are not subject to the foregoing problems and disadvantages.

It is a further object of this invention to provide a new and improved set of three vertex fittings for the construction of the constituent triangular frame elements of a truss structure, which have accurately aligned surfaces, slots and holes.

It is another object of this invention to provide a set of vertex fittings for the construction of a hinged joint to connect three triangular frame elements together at their vertices.

It is still another object of this invention to simplify the fabrication process of the individual vertex fittings and thereby reduce production costs.

It is an additional object of this invention to provide a new and improved master fitting which may be subdivided to provide a set of three different vertex fittings that are individually interchangeable with corresponding vertex fittings of an identically fabricated set.

SUMMARY OF THE INVENTION

The foregoing objects of the invention are achieved through the use of a new and improved set of vertex fittings which are fabricated by subdividing a single master fitting. By performing the various required machining operations on a single master fitting, rather than on three individual vertex fittings, greater reproducibility and better alignment of surfaces, slots and holes between the individual fittings in a frame element is achieved. Thus, only a single machining set-up is required to fabricate the master fitting which is subdivided by cutting in three planes to form the set of three different vertex fittings.

A further feature of the present invention is directed to the improved connection of the vertex fittings to the struts. This is achieved by the use of a novel end connector tab at both ends of each strut, which tabs fit into slots in the top face of the vertex fittings. This arrangement provides a connection which can be easily and quickly assembled and which allows a single strut to be quickly and easily replaced in a truss structure without disassembly of any other portion of the truss.

These and other objects of the present invention, together with the features and advantages thereof will become apparent from the following detailed specification, when considered in conjunction with the accompanying drawings in which applicable reference numerals are carried forward.

BRIEF DESCRIPTION OF THE DRAWINGS

FIG. 4B illustrates the interconnection of two struts with a vertex fitting.

FIGS. 5A and 5B illustrate certain features for interconnecting a set of vertex fittings with each other.

DETAILED DESCRIPTION OF THE INVENTION

Figure 1:
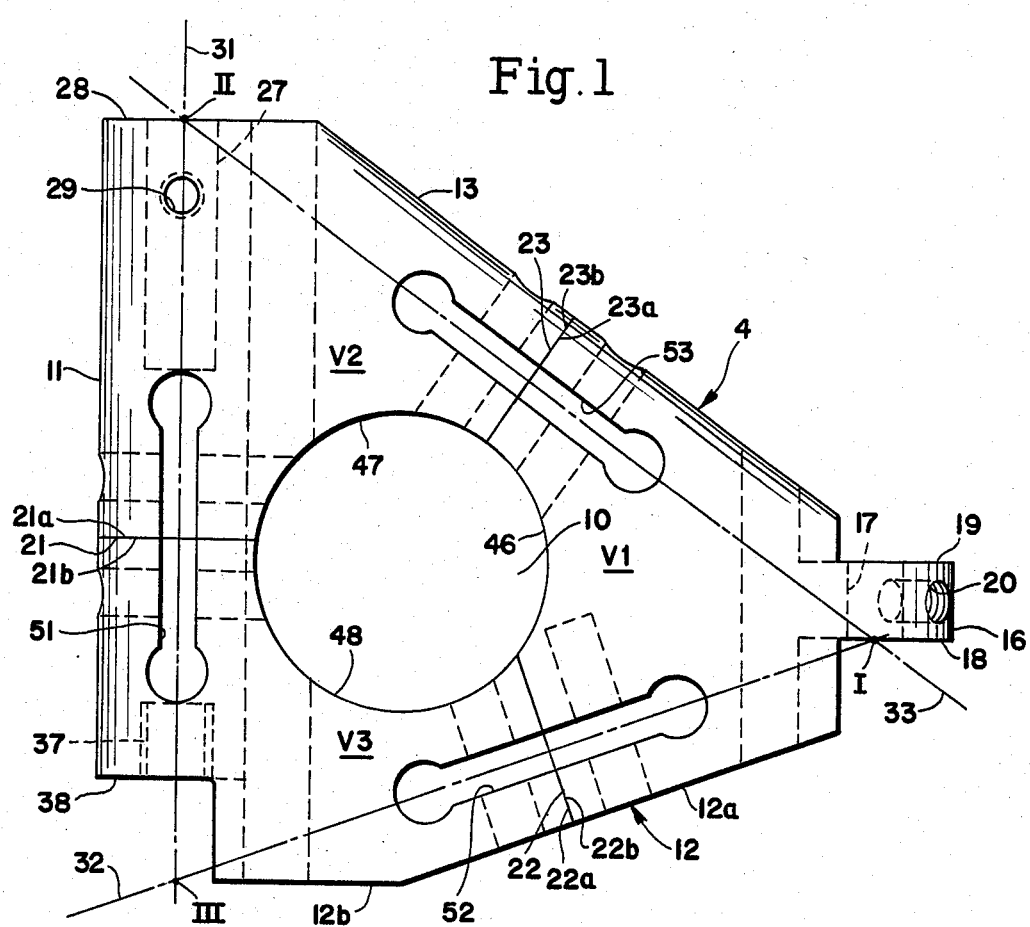
FIG. 1 is a top view of a master fitting in accordance with the present invention, divisible into a set of three vertex fittings.
Figure 2:
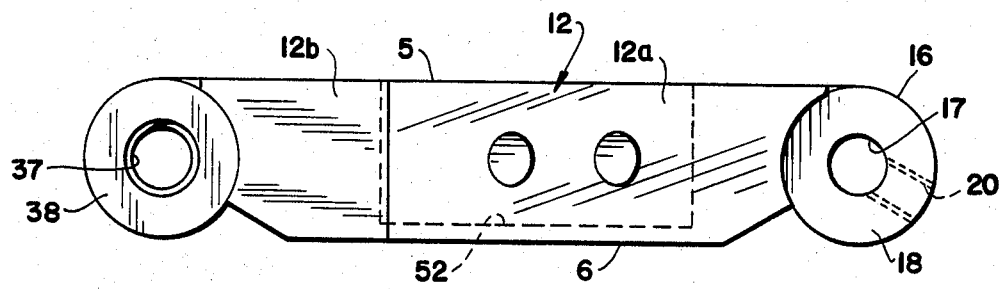
FIG. 2 is an elevation view taken along one side of the master fitting of FIG. 1.
Figure 3:
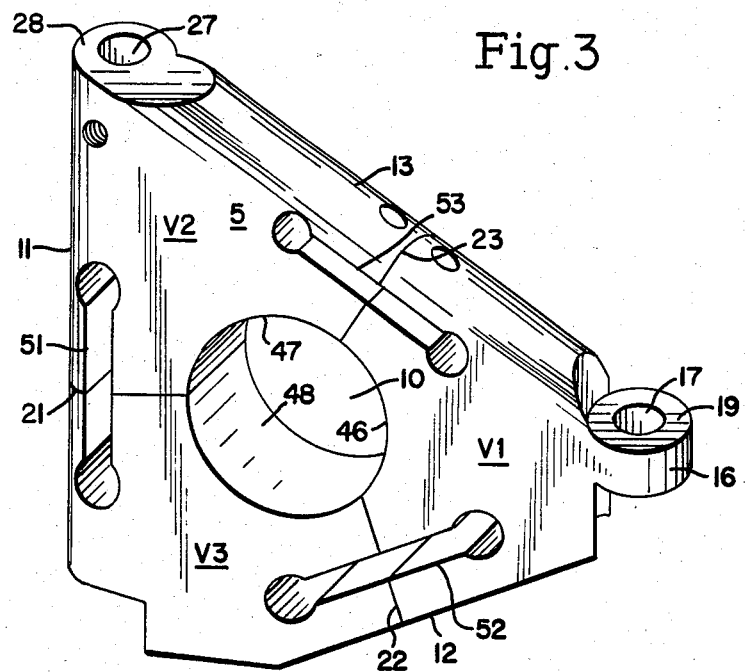
FIG. 3 is a perspective view of the master fitting of FIG. 1.

Referring now to the drawings, and particularly to FIGS. 1, 2 and 3, a master fitting is shown which has the shape of a triangular slab 4 having top and bottom faces 5 and 6, respectively. It should be noted that the designations "top face" and "bottom face" are arbitrary and are chosen only for illustrative purposes. The shape of slab 4 is best visualized by means of three imaginary reference lines 31, 32 and 33, which intersect at vertex points I, II and III to form an isoceles triangle. The triangle defines the general shape of slab 4, lines 31 and 32 being substantially equal in length and shorter than line 33. Slab 4 further includes first, second and third vertex regions V1, V2 and V3 which contain vertex points I, II and III, respectively.

Reference line 31 is the axis of a cylindrical surface which forms side 11 of the slab and which is substantially parallel to line 31. Reference line 33 is the axis of another cylindrical surface which forms side 13, which is substantially parallel to line 33. As best shown in FIG. 2, these cylindrical surfaces have a diameter approximately equal to the thickness of slab 4. Side 12 includes two planar surfaces 12a and 12b, both perpendicular to top and bottom slab faces 5 and 6. Surface 12a is parallel to reference line 32 and surface 12b is perpendicular to reference line 31. A cylindrical hole 10 extends between top and bottom slab faces 5 and 6, its axis being perpendicular to these faces. Top slab face 5 also includes three strut connection slots 51, 52 and 53, which are aligned with reference lines 31, 32 and 33, respectively.

Vertex region V1 includes a tab 16 which is cylindrical in shape and is shown to contain a through-hole 17 and a set screw hole 20. The axis of through-hole 17 is parallel to line 31 and the axis of set screw hole 20 is preferably perpendicular to the latter axis. The diameter of tab 16 is approximately equal to the thickness of slab 4. Tab 16 further includes a pair of mutually spaced bearing surfaces 18 and 19, which are substantially perpendicular to the axis of through-hole 17.

Vertex region V2 includes a socket 27 coaxial with reference line 31 and a bearing surface 28 substantially perpendicular to reference line 31. A lock screw hole 29 extends from top slab face 5 to socket 27 and has an axis substantially perpendicular to line 31.

Vertex region V3 includes a mounting hole 37 coaxial with reference line 31 and a bearing surface 38 substantially perpendicular to reference line 31. As shown in FIGS. 5A and 5B, mounting hole 37 is adapted to accept the extension of a fastening pin 61 to secure such pin in the mounting hole.

Once all machining steps have been completed on the master fitting, it is subdivided into three separate vertex fittings V1, V2 and V3. This operation is carried out by cutting along planes 21, 22 and 23 which are normal to reference lines 31, 32 and 33, respectively, as well as to slab faces 5 and 6. The three cuts extend from sides 11, 12 and 13, respectively, to cylindrical hole 10 and they bisect the three strut connection slots 51, 52 and 53. Each cut produces a pair of facing contact surfaces 21a, 21b; 22a, 22b; and 23a, 23b in planes 21, 22 and 23, respectively. A set of vertex fittings V1, V2 and V3, all different from each other, is thus produced and each vertex fitting has two contact surfaces angled relative to each other. Specifically, vertex fitting V1 includes a pair of contact surfaces 22b and 23a; vertex fitting V2 includes contact surfaces 21a and 23b; and vertex fitting V3 includes contact surfaces 22a and 21b. The accuracy of the cuts in planes 21, 22 and 23 insures the subsequent alignment of the vertex fitting contact surfaces with the strut end contact surfaces.

Figure 4A:
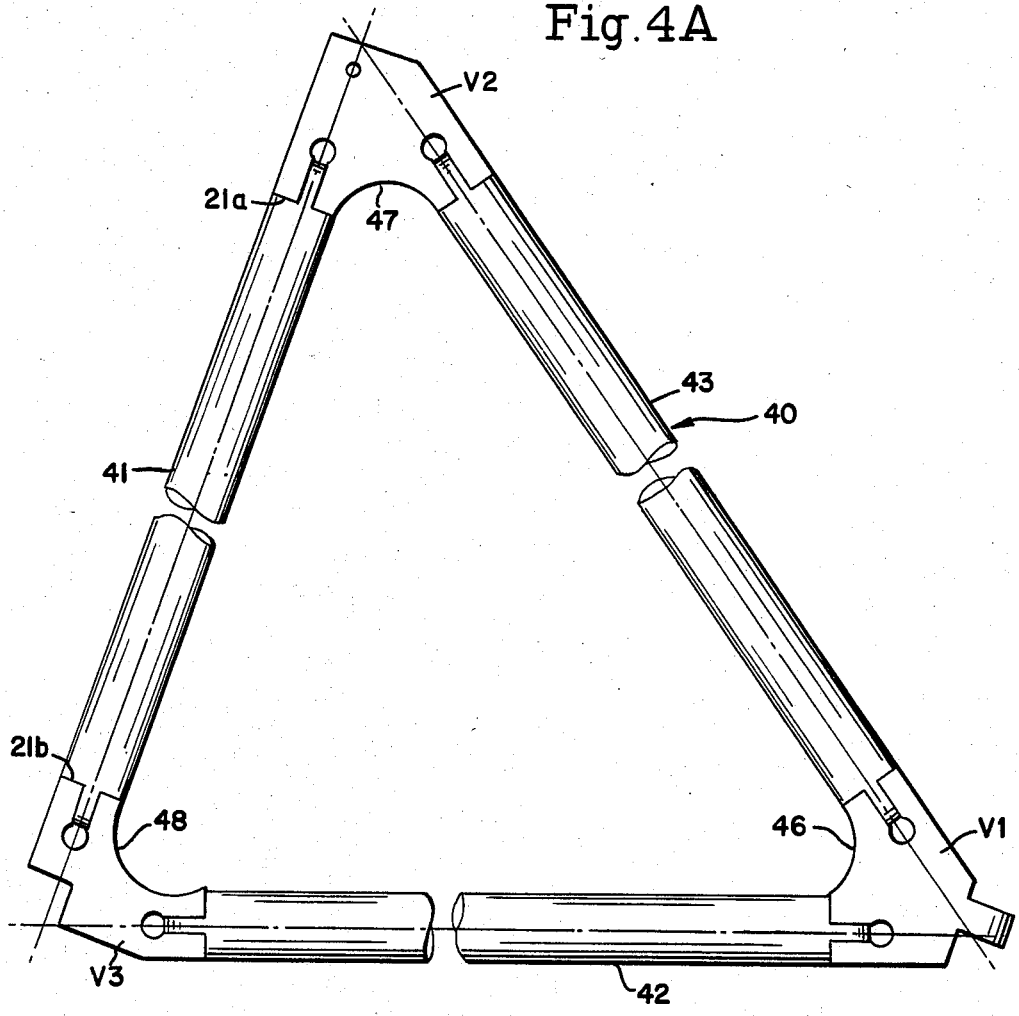
FIG. 4A illustrates an assembled triangular frame element which uses the vertex fittings of FIG. 1.

FIG. 4A illustrates a frame element 40 constructed with vertex fittings fabricated in accordance with the principles of the present invention. FIG. 4B illustrates the interconnection of a vertex fitting with two struts. Frame element 40 includes three struts 41, 42 and 43, each interposed between a pair of mutually spaced, facing contact surfaces belonging to respective vertex fittings V1, V2 and V3. For example, strut 41 is connected between mutually facing contact surfaces 21a and 21b. Assuming the set of vertex fittings is derived from a single common master fitting, it will be clear that contact surfaces 21a and 21b were created by a single cut along plane 21. Similarly, struts 42 and 43 are each connected between a pair of facing contact surfaces that were originally joined together under the assumed conditions. Thus, by the fabrication method employed herein, wherein each set of vertex fittings is derived in identical manner from a separate, identical master fitting, corresponding vertex fittings from different sets are interchangeable with each other. Hence, each pair of facing contact surfaces will be in alignment even if the vertex fittings were derived from separate master fittings.

An end connector tab 44 on strut 41 engages a bisected slot 51a of vertex fitting V3 and is fastened therein by a securing pin 45. The end contact surface 49 of strut 41 abuts contact surface 21b of vertex fitting V3. Each strut end is secured to a vertex fitting in this manner. FIG. 4B also shows curved fillet surface 48. This fillet surface derives from cylindrical hole 10, best shown in FIG. 1, which is composed of curved surface portions 46, 47 and 48 belonging to vertex fittings V1, V2 and V3, respectively.

A plurality of identical triangular frame elements is used to construct the desired truss structure by the use of a basic repeating joint. As shown in FIG. 5A, three frame elements are interconnected by means of a single hinge joint, which uses one of each of the three different types of vertex fittings, here designated V1′, V2′ and V3′, respectively. Through-hole 17 in tab 16 of vertex fitting V1′ of a first frame element is adapted to receive fastening pin 61 which is secured in mounting hole 37 of vertex fitting V3′ of a second frame element. Bearing surface 19 of tab 16 abuts bearing surface 38 of vertex fitting V3′. Fastening pin 61 is secured in tab 16 by a set screw in set screw hole 20. Next, the free end of fastening pin 61 is inserted into socket 27 of a vertex fitting V2′ of a third frame element, where it is secured by a lock screw in lock screw hole 29. This further interconnection causes bearing surface 18 on tab 16 of vertex fitting V1′ to abut bearing surface 28 of vertex fitting V2′.

As explained above in connection with FIGS. 4A and 4B, each pair of facing contact surfaces of the vertex fittings is accurately aligned, having been produced either by a single cut, or by identical cuts on substantially identical master fittings. The same cut (or cuts) also provides bisected strut connection slots with aligned centerlines. Accordingly, the struts of any pair of frame elements that have mutually facing contact surfaces will be accurately aligned with the vertex fittings.

Similarly, the bearing surfaces of the respective vertex fittings are accurately located and precisely angled due to the precision and repeatability made possible by carrying out the machining steps required for each set of vertex fittings on a single master fitting. Such precision assures that corresponding vertex fittings derived from different master fittings will be interchangeable and that all the frame elements required for the construction of the truss will be substantially identical. The invention also reduces the production costs of individual vertex fittings by reducing the number of machining steps required. Finally, the novel connection of the struts to the vertex fittings by the use of slots in the vertex fittings in conjunction with mating connecting tabs on the struts, allows for easy and quick removal and replacement of a strut, even in a fully constructed truss structure.

While the present invention has been shown and described with reference to a preferred embodiment, it will be understood that numerous modifications, changes, variations, substitutions and equivalents will now occur to those skilled in the art without departing from the spirit and scope of the invention. Accordingly, it is intended that the invention herein be limited only by the scope of the appended claims.

What is claimed is:

1. A master fitting adapted to provide a set of first, second and third vertex fittings for use in a truss structure which includes a plurality of interconnected triangular frame elements, wherein each of said frame elements comprises first, second and third vertex fittings and struts interposed therebetween; said master fitting comprising:

a generally triangular slab including substantially planar, parallel top and bottom slab faces, the configuration of said slab being generally defined by first, second and third reference lines intersecting at first, second and third vertex points which lie in first, second and third vertex regions, respectively, said first, second and third vertex regions being positioned generally opposite said first, second and third reference lines, respectively;

said first and second reference lines being approximately equal in length and shorter than said third reference line;

said slab further including first, second and third sides substantially parallel to said first, second and third reference lines, respectively;

said first vertex region comprising a tab extending outwardly from said slab and including a through-hole, said through hole having an axis substantially parallel to said slab faces and to said first reference line;

said second and third vertex regions comprising a socket and a mounting hole, respectively, coaxial with said first reference line;

whereby said master fitting is adapted to be subdivided into said first, second and third vertex fittings by means of three cuts normal to each of said reference lines and to said slab faces, said cuts providing a pair of contact surfaces on each of said vertex fittings angled relative to each other, said last-recited contact surfaces being adapted to abut corresponding end contact surfaces on said struts upon construction of said frame element.

2. A master fitting according to claim 1, and further including a cylindrical hole located approximately centrally in said slab and communicating between said top and bottom slab faces, each of said cuts dividing one of said slab sides and extending between the latter and said hole;

whereby the cylindrical surface of said hole defines a fillet surface on each of said vertex fittings when said master fitting is subdivided.

3. A master fitting according to claim 1, wherein said first and third sides further include partial cylindrical surfaces having said first and third reference lines, respectively, as the axes of generation, each of said cylindrical surfaces having a diameter substantially equal to the thickness of said slab between said slab faces;

said second side including a first planar surface perpendicular to said slab faces and substantially parallel to said second reference line, and a second planar surface substantially perpendicular to said slab faces and to said first reference line.

4. A master fitting according to claim 3, wherein end connector tabs extend from both ends of each of said struts;

said slab including first, second and third strut connection slots in said top slab face aligned with respective ones of said reference lines and positioned so as to be substantially bisected by said cuts, each of said bisected slots being adapted to mate with one of said end connector tabs of said struts.

5. A master fitting according to claim 1, wherein said socket and said mounting hole each extend into said slab from a corresponding bearing surface normal to said first reference line;

said tab including a pair of mutually spaced bearing surfaces normal to said through hole axis;

whereby each set of first, second and third vertex fittings is alternatively adapted to be interconnected by means of a fastening pin to form a hinged joint for three of said frame elements, said fastening pin being adapted to be secured in said mounting hole and to hingedly engage said tab and said socket, said tab bearing surfaces each being in contact with one of said bearing surfaces corresponding to said socket and mounting hole, respectively.

6. A master fitting according to claim 5, wherein said tab further includes a set screw hole adapted to receive a set screw for securing said fastening pin in said tab; and said socket including a lock screw hole adapted to receive a lock screw for securing said fastening pin in said socket.

7. A set of first, second and third vertex fittings adapted to be used with corresponding struts to construct a triangular frame element, said set of vertex fittings being derived from one of a plurality of substantially identical master fittings, each of said master fittings having the shape of a substantially triangular slab adapted to be identically divided by means of three dividing cuts such that each vertex fitting of said set is interchangeable with a corresponding vertex fitting derived from a different one of said master fittings;

each of said cuts being substantially normal to one side of said triangular slab and producing a pair of facing contact surfaces where said vertex fittings were previously joined, and each of said vertex fittings including two separate contact surfaces angled relative to each other;

said first vertex fitting comprising a tab extending outwardly therefrom, said tab including a through-hole; and said second and third vertex fittings comprising a socket and a mounting hole, respectively;

whereby a triangular frame element may be constructed by mutually spacing each of said pairs of facing contact surfaces and connecting a strut therebetween, and whereby a truss may be assembled from a plurality of said frame elements interconnected by means of hinge joints, each of said hinge joints including a separate set of said vertex fittings positioned such that said mounting hole, said through hole and said socket are in sequential alignment with each other and are jointly engaged by a fastening pin.

8. A set of vertex fittings according to claim 7, wherein end connector tabs extend from both ends of each of said struts;

said master fitting including first, second and third strut connection slots substantially parallel to respective sides of said slab, each of said slots being substantially bisected by said cuts, and each of said bisected slots being adapted to mate with one of said end connector tabs.

9. A set of vertex fittings according to claim 7, wherein said socket extends into said second vertex fitting from a corresponding bearing surface normal to the axis of said socket;

said mounting hole extending into said third vertex fitting from a corresponding bearing surface normal to the axis of said mounting hole;

said tab including a pair of mutually spaced bearing surfaces normal to the axis of said through hole;

whereby each set of first, second and third vertex fittings is adapted to be interconnected by means of a fastening pin to form a hinged joint for three of said frame elements, said fastening pin being adapted to be secured in said mounting hole and to hingedly engage said tab and said socket, said tab bearing surfaces each being in contact with one of said bearing surfaces corresponding to said socket and mounting hole, respectively.

10. A set of vertex fittings for use in a truss structure of the type which comprises a plurality of triangular frame elements and multiple sets of said vertex fittings;

said set comprising first, second and third vertex fittings derived by means of three dividing cuts from one of a plurality of substantially identical master fittings, said master fittings each having the shape of a substantially triangular slab and being adapted to be identically divided such that each vertex fitting of said set is interchangeable with a corresponding vertex fitting derived from a different one of said master fittings;

each of said cuts being substantially normal to one side of said triangular slab and producing a pair of facing contact surfaces where said vertex fittings were previously joined, and each of said vertex fittings including two separate contact surfaces angled relative to each other;

said first vertex fitting comprising a tab extending outwardly therefrom, said tab including a through-hole and a pair of mutually spaced bearing surfaces normal to the axis of said through hole;

a socket and a mounting hole extending into said second and third vertex fittings respectively, from a corresponding bearing surface of said fitting;

whereby said set of vertex fittings is adapted for the construction of a single frame element by interconnecting a strut between each pair of said facing contact surfaces mutually spaced from each other; or alternatively to form a hinged joint for a group of three frame elements wherein the bearing surfaces of said second and third vertex fittings abut said pair of tab bearing surfaces, and wherein a common fastening pin coaxially engages said mounting hole, said through-hole and said socket.

* * * * *